United States Patent
Cooper et al.

(10) Patent No.: US 10,691,484 B2
(45) Date of Patent: Jun. 23, 2020

(54) REDUCING COMMIT WAIT IN A DISTRIBUTED MULTIVERSION DATABASE BY READING THE CLOCK EARLIER

(71) Applicant: Google Inc., Mountain View, CA (US)

(72) Inventors: Brian Frank Cooper, San Jose, CA (US); Alexander Lloyd, New York, NY (US); Sebastian Kanthak, San Jose, CA (US); Andrew Fikes, Los Altos, CA (US); Christopher Taylor, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 367 days.

(21) Appl. No.: 15/649,920

(22) Filed: Jul. 14, 2017

(65) Prior Publication Data

US 2018/0329739 A1   Nov. 15, 2018

Related U.S. Application Data

(60) Provisional application No. 62/506,177, filed on May 15, 2017.

(51) Int. Cl.
*G06F 17/00* (2019.01)
*G06F 9/46* (2006.01)
(Continued)

(52) U.S. Cl.
CPC ............ *G06F 9/466* (2013.01); *G06F 9/524* (2013.01); *G06F 9/528* (2013.01);
(Continued)

(58) Field of Classification Search
CPC .......... G06F 9/466; G06F 9/524; G06F 9/528; G06F 16/2308; G06F 16/2379; G06F 15/00
See application file for complete search history.

(56) References Cited

U.S. PATENT DOCUMENTS

| | | | |
|---|---|---|---|
| 6,636,851 B1 | 10/2003 | Bamford et al. | |
| 9,203,600 B1 | 12/2015 | Hochschild et al. | |
| 2018/0167460 A1* | 6/2018 | Hsieh | G06F 16/1767 |

OTHER PUBLICATIONS

James C Corbett et al: "Spanner: Google's Globally Distributed Database." ACM Transactions on Computer Systems (TOCS), Oct. 9, 2012 (Oct. 9, 2012), pp. 251-264, XP055455712, US, ISSN: 0734-2071.

(Continued)

*Primary Examiner* — Syed H Hasan
(74) *Attorney, Agent, or Firm* — Lerner, David, Littenberg, Krumholz & Mentlik, LLP (57) ABSTRACT

In a distributed system where a client's call to commit a transaction occurs outside the transaction's lock-hold interval, computation of timestamp information for the transaction is moved to a client library, while ensuring that no conflicting reads or writes are performed between a time of the computation and acquiring all locks for the transaction. The transaction is committed in phases, with each phase being initiated by the client library. Timestamp information is added to the locks to ensure that timestamps are generated during lock-hold intervals. An increased number of network messages is thereby overlapped with a commit wait period in which a write in a distributed database is delayed in time to ensure concurrency in the database.

20 Claims, 8 Drawing Sheets

(51) Int. Cl.
*G06F 9/52* (2006.01)
*G06F 16/23* (2019.01)
*G06F 15/00* (2006.01)

(52) U.S. Cl.
CPC ...... *G06F 16/2308* (2019.01); *G06F 16/2379* (2019.01); *G06F 15/00* (2013.01)

(56) References Cited

OTHER PUBLICATIONS

Faisal Nawab et al: "Minimizing Commit Latency of Transactions in Geo-Replicated Data Stores." Proceedings of the 2015 ACM SIGMOD International Conference on Management of Data, SIGMOD '15, May 31, 2015 (May 31, 2015), pp. 1279-1294, XP055455717, New York, New York, USA, DOI: 10.1145/2723372.2723729, ISBN: 978-1-4503-2758-9.

Murat Demirbas et al: "Beyond TrueTime: Using AugmentedTime for Improving Spanner." Aug. 23, 2013 (Aug. 23, 2013), pp. 1-5, XP055455692, Retrieved from the Internet: <http://www.cse.buffalo.eduj-demirbas/publicationsjaugmentedTime.pdf>. [retrieved on Mar. 1, 2018].

Murat Demirbas: "Metadata." Aug. 23, 2013 (Aug. 23, 2013), pp. 1-2, XP055455688, Blogspot. Retrieved from the Internet: <http:jjmuratbuffalo.blogspot.nl/2013/08/beyond-truetime-using-augmentedtime-for.html>. [retrieved on Mar. 1, 2018].

Manuel Bravo et al: "On the use of Clocks to Enforce Consistency in the Cloud." Bulletin of the IEEE Computer Society Technical Committee on Data Engineering, vol. 38, No. 1, Mar. 31, 2015 (Mar. 31, 2015), pp. 18-31, XP055455697.

International Search Report and Written Opinion dated Mar. 8, 2018, for International Application No. PCT/US2018/015007. 16 pages.

International Preliminary Report on Patentability dated Nov. 28, 2019 for International Application No. PCT/US2018/015007. 10 pages.

* cited by examiner

| | Input statement for Transaction T | | | |
|---|---|---|---|---|
| | BEGIN | COMMIT | ABORT | WRITE v = E |
| History and database state | T: BEGIN birthday(T) = Now().upper | T: COMMIT ts(T) = NewTS_Delay() DoWrites(T) PrepareLocks(T) DoCommit_Delay(T) WaitUntil(ts(T)) ReleaseLocks(T) T: END @ ts(T) | T: CLIENT ABORT ts(T) = NewTS_Delay() AbortLocks(T) T: END ABORT @ ts(T) | AcquireWriteWW_Delay(v, T) AcquireReadWW(E, T) Assign(v, E, T) |
| Proof state | | UpdateCommitted(T) | Remove all edges $(e_i, e_j)$ where $e_i$ is a WRITE in T. | AddNewEdges(v, E, T) UpdatePending(v, E, T) |

REDUCING COMMIT WAIT IN A DISTRIBUTED MULTIVERSION DATABASE BY READING THE CLOCK EARLIER

CROSS-REFERENCE TO RELATED APPLICATIONS

The present application claims the benefit of the filing date of U.S. Provisional Patent Application No. 62/506,177 filed May 15, 2017, the disclosure of which is hereby incorporated herein by reference.

BACKGROUND

In database systems, the term concurrency control refers to the algorithm used to ensure that the database has sensible semantics, even in the presence of concurrency. Multiversion concurrency-control algorithms store multiple versions of a given piece of data (one per write), so as to enable greater concurrency. Ideally, a distributed database is semantically equivalent to a single-machine database; concurrency control algorithms that guarantee such a semantics are called "externally consistent". In an externally-consistent, multiversion, distributed database, consistent reads in the past can be done across the entire database without holding locks. Reads and writes in the present, such as those within read-write transactions, use local synchronization between reads and writes at each object in the database; strict 2-phase locking, along with commit wait (where a transaction delays commit until the timestamp of the transaction is in the past) guarantee external consistency.

Some distributed databases provide an implementation of a virtual global clock, which increases monotonically and reflects real time. Because there is necessarily observational uncertainty in the clock's value, and because events in a program are not instantaneous, a client cannot read the exact value of the clock at any point in time. Instead, the client may be provided with a function that returns an open interval of time in which the lower bound of the interval is lower than the value of the global clock at the instant when the function finishes executing, and the upper bound of the interval is higher than the value of the global clock at the instant when the function starts executing. The function should guarantee that the interval is non-empty. Because time uncertainty fluctuates over time, the width of the returned time interval fluctuates as well. Commit wait takes the upper bound on such an interval and waits until that time has passed.

Existing solutions perform time-based synchronization while holding user-level locks at servers. That is, while writing an object in the database, the server performs commit wait while holding the implementation-level lock that protects exclusive access to the object being written.

BRIEF SUMMARY

When committing transactions in a distributed system, commit wait times may be reduced by using an earlier timestamp. In particular, a timestamp is calculated by a client library prior to acquisition of locks for committing the transaction. The timestamp is calculated based on a range of uncertainty across clocks in the distributed system.

One aspect of the disclosure provides a method, wherein a client in a distributed system receives a transaction to be committed, computes a tentative value for a current time plus a variable corresponding to bounds of uncertainty of clocks in the distributed system, the clocks including at least a client clock at the client and a server clock at the server, and initiates a commit for the transaction based on the computed tentative value, wherein initiating the commit for the transaction occurs before all locks are acquired. The method may further include acquiring locks for the transaction, executing a write for the transaction, commit wait, and releasing the locks. Moreover, the method may include adding timestamp information to locks, where the timestamp information is used to ensure that the transaction's timestamp is within the lock-hold interval of the transaction. The lock-hold interval is a period of time during which a server holds all of the locks for the transaction, preventing reads and/or writes (depending on the mode in which the lock is held) of a portion of the database during that span of time. The added timestamp information may include a max read timestamp of a latest committed read, and a max write timestamp of a latest committed write. Executing the write for the transaction may be delayed based on at least one of the max read timestamp or the max write timestamp.

The transactions committed may be any of a variety of transactions, such as reads, writes, read-modify-write, etc. In some examples, the transaction may be received at the client and temporarily stored in a memory of the client.

If the transaction is a write command that is buffered in a memory of the client, the method may further include ensuring that there are no conflicting reads or writes between computing the tentative timestamp and when the transaction finishes acquiring its locks. In some instances, the computed tentative timestamp is used as a timestamp for the transaction.

Another aspect of the disclosure provides a system, including a client device having one or more processors programmed to receive a transaction to be committed to a server in communication with the client, and initiate a commit for the transaction prior to the server acquiring locks. The client device initiates a commit and computes a tentative timestamp for the transaction, such as a value for a current time plus a variable corresponding to bounds of uncertainty of clocks in the distributed system, the clocks including at least a client clock at the client and a server clock at the server. This computation is performed outside of the lock-hold interval. The one or more processors may be further programmed to acquire locks for the transaction, execute a write for the transaction using the computed tentative timestamp from the client, commit wait, and release the locks. The commit wait may include waiting for a period of time for the computed tentative timestamp to pass. Further, the one or more processors may also be programmed to add timestamp information to locks, wherein the timestamp information for the locks is used to ensure that the transaction's timestamp is within the lock-hold interval for the transaction. The added timestamp information for the locks may include a max read timestamp of a latest committed read, and a max write timestamp of a latest committed write. Executing the write for the transaction may be delayed based on at least one of the max read timestamp or the max write timestamp. Where the transaction is a write buffered in a memory of the client, the one or more processors may be further programmed to ensure that there are no conflicting reads or writes between the computing the tentative value and when the transaction finishes acquiring its locks. The server may be programmed to defer acquisition of a write lock or execution of the write until the client calls for commit.

Yet another aspect of the disclosure provides a non-transitory computer-readable medium storing instructions executable by one or more processors for performing a method. Such method includes receiving, at a client in a distributed system, a transaction to be committed to the distributed system, and computing, at a client library of the client, a tentative timestamp for the transaction. The computed timestamp may be calculated as a current time plus a variable corresponding to bounds of uncertainty of clocks in the distributed system, the clocks including at least a client clock at the client and a server clock at the server, and initiating a commit for the transaction outside of a lock-hold interval.

A further aspect provides means for receiving a transaction to be committed to a distributed database, means for computing, at a client library of the client, a tentative timestamp for the transaction. The tentative timestamp may correspond to a value for a current time plus a variable corresponding to bounds of uncertainty of clocks in the distributed system, the clocks including at least a client clock at the client and a server clock at the server. Means are further provided for initiating a commit for the transaction outside of the lock-hold interval for the transaction, wherein the computed tentative timestamp value may be used to commit the transaction.

DETAILED DESCRIPTION

Overview

The technology relates generally to optimizing committing of a transaction in a distributed system. A tentative timestamp for the transaction is determined by a client library prior to acquisition of locks by the server. The computed tentative timestamp may be equal to (current time+$\varepsilon$), where $\varepsilon$ corresponds to bounds of uncertainty of local clocks in the distributed system. As another example, the tentative timestamp may be computed by selecting a latest timestamp in the bounds of uncertainty of global time, such that the selected timestamp will be later than any conception of global timee. As yet another example, the computed tentative timestamp may be the latest timestamp plus a variable, such as 1 us, 1 ms, or any other value where the system guarantees that all clocks are within that value of each other.

Determining the value of (current time+$\varepsilon$) may be performed in different ways depending on a protocol used in the distributed database. For example, a first protocol implements strict two-phase locking for a transaction, wherein locks are acquired in the first phase ("lock acquisition") and locks are held in the second phase ("lock-hold interval"), which lasts until the end of the transaction. If transactions acquire all of their locks prior to the initiation of commit, evaluating (current time+$\varepsilon$) in the client library immediately after commit is requested would produce a same result as if it was evaluated at the server.

The present disclosure focuses more on a scenario involving a second protocol, where not all of the locks for a transactions have been acquired prior to the client's call to commit, which implies that the commit is not within the transaction's lock-hold interval. Accordingly, evaluating (current time+$\varepsilon$) in the client library requires additional operations. In particular, timestamp information is added to the locks to ensure that timestamps are generated during lock-hold intervals. For example, a timestamp (max_read) of the latest committed read of a variable v is associated with the variable, and a timestamp (max_write) of the latest committed write of the variable v is associated with the variable. The max_read and max_write timestamps are used in a commit protocol to ensure consistency, the commit protocol including a series of functions performed in relation to the commit. Such functions include, in order, DoWrites, PrepareLocks, and DoCommit_Delay, which are described further below.

Using the added timestamp information and functions described above, a transaction T is committed in phases: Begin, Write, and Commit (or Abort). Each phase is initiated by the client library. During the Begin phase, the client library assigns a unique identifier to the transaction T. During the Write phase, the client library sends one or more read or write commands to the server including the unique identifier. A function AcquireWriteWW_Delay is executed by the client library, which computes max_reads for all values of v, but defers acquiring the write lock and doing the write until the client calls commit. For example, for reads in read-write transactions, the client library sends reads to the server, where the reads acquire locks. The server executes the reads, and returns the results back to the client via the client library. For writes in read-write transactions, the writes are buffered at the client and sent later to the server. A next function in the Write phase, AcquireReadWW, is also performed, which acquires a read lock while trying to avoid deadlock. For example, if a higher priority transaction requires a lock held by another lower priority transaction, the lower priority transaction releases its locks and tries again. Also in the Write phase, a function Assign is performed, which assigns a value of an expression E to the variable v. The Assign function may also keep track in a table of all variables and as signed values.

The client library then initiates the Commit phase, and the server commits the transaction. During this Commit phase, the client library executes the functions DoWrites, PrepareLocks, DoCommit_Delay, WaitUntil(ts), and ReleaseLocks. DoWrites acquires all locks and does writes that were saved as a result of calls to AcquireWriteWW. PrepareLocks logs all locks so that locks are held persistently. DoCommit_Delay sends a message to the server to do the commit, and also updates max_read and max_write for all values of the variable v. WaitUntil causes the client to wait a period of time before releasing the locks through execution of the function ReleaseLocks. For example, during the period of time that the client waits, the client may periodically call for an updated current time, in response to which a value from a global clock is returned. When the updated current time that is returned is a value greater than the previously computed value of (current time+ε), the waiting period ends and the locks are released.

In this regard, evaluation of (current time+ε) for a transaction may be performed at a client library, while ensuring that no conflicting reads or writes are performed between a time of evaluating (current time+ε) and acquiring all locks for the transaction. By choosing a tentative timestamp at the client library, it may be the case that the eventual transaction timestamp is earlier (by approximately the amount of time to send the commit message to the server). Thus, transactions may spend less time in commit wait, and be committed earlier, resulting in increased efficiency and speed in computing environments, while maintaining consistency across a number of computing devices spread across various geographic locations.

Examples Systems

Figure 1:
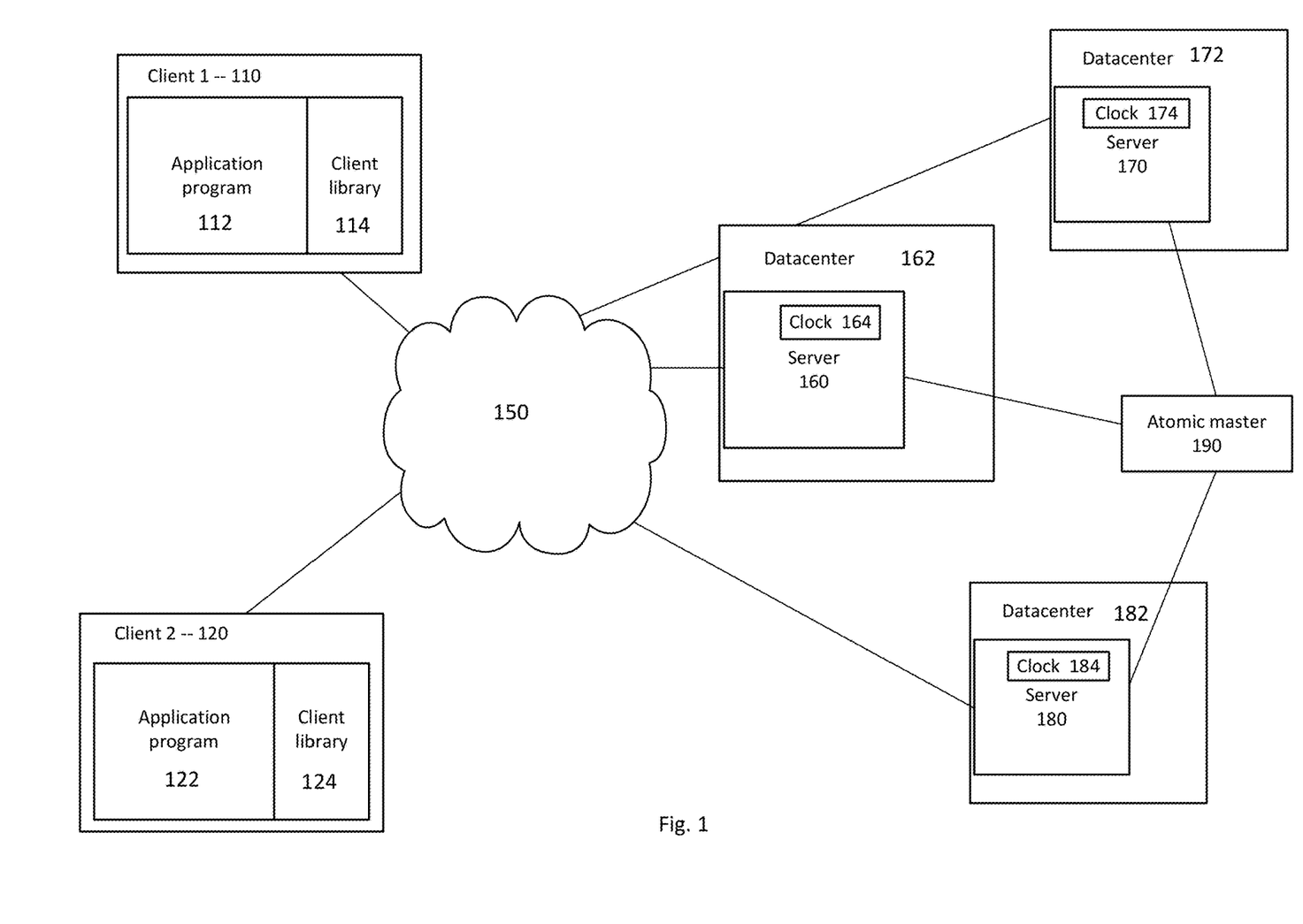
FIG. 1 is a block diagram illustrating an example system according to aspects of the disclosure.

FIG. 1 illustrates an example system including a distributed database. A plurality of servers 160, 170, 180 may communicate with each other, for example, over a network 150. The servers 160, 170, 180 may further communicate with a plurality of client devices, such as clients 110, 120. The servers 160-180 may control storage of data in one or more databases. For example, as shown each server 160-180 is associated with a datacenter 162, 172, 182. Each datacenter 162, 172, 182 may include a plurality of computing devices for storing data. The distributed database may implement a protocol, such as Paxos, to provide consensus across the system. In some current systems, consistency across the datacenters 162, 172, 182 is maintained by the servers 160, 170, 180, which wait for a period of time (e.g., the commit wait) to pass before publishing a write transaction. To reduce negative effects of this wait time, such as delays and decreased throughput, some network messages between the clients and servers can be overlapped with the commit wait period. For example, by determining timestamps for the transaction at the client device, messages from the client to the server to effect writes and commits can be performed during the commit wait period.

While only a few servers are shown, it should be understood that any number of servers may be included in the distributed database. Similarly, while each server 160, 170, 180 is shown as being associated with its own datacenter, it should be understood that in other examples the servers may be associated with one or more smaller databases. For example, one database may include multiple servers. Examples of distributed systems are further described in U.S. patent application Ser. No. 13/905,637, which is hereby incorporated by reference herein in its entirety.

Each of clients 110, 120 is shown as having an application program 112, 122 and a client library 114, 124, though it should be understood that additional features of client devices may also be present. Either of the clients 110, 120 may write data to the distributed database by sending data over the network 150 to one of the servers 160, 170, 180. While only a few clients are shown, it should be understood that a vast number of client devices may communicate with the distributed database over the network 150.

The datacenters 162, 172, 182 may be positioned a considerable distance from one another. For example, as further described in connection with FIG. 2, the datacenters may be positioned in various countries around the world. Each datacenter 162, 172, 182 may include a number of storage devices, such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 162, 172, 182 may be virtualized environments.

Each server has a local clock 164, 174, 184. Each local clock 164, 174, 184 may derive its time from an atomic time master 190. Atomic time master 190 may be, for example, a reference clock in communication with one or more servers in the distributed database. As further described below in connection with FIG. 3, the atomic time master 190 may derive its time from another source, such as a GPS.

Each of the servers 160, 170, 180 may have a different value for the current time. For example, the clock 164 may be different from the clock 174 which may be different from the clock 184. These differences may be based on, for example, parent servers and factors such as drift, oscillator frequency uncertainty, calibration interval, etc. This range of uncertainty among devices in the distributed database is signified by a value ε. Each clock in the database may maintain a time interval ε, representing uncertainty bounds. The time interval ε is determined, for example, during calibration as described below in connection with FIG. 3, based on oscillator frequency uncertainty, calibration phase uncertainty, etc. To maintain external consistency among the devices, the client 110 and/or the server 160 may enforce a commit wait time based on E before accessing objects recently written to the distributed database. That period of time corresponds to the uncertainty bounds of the local clock.

Figure 2:
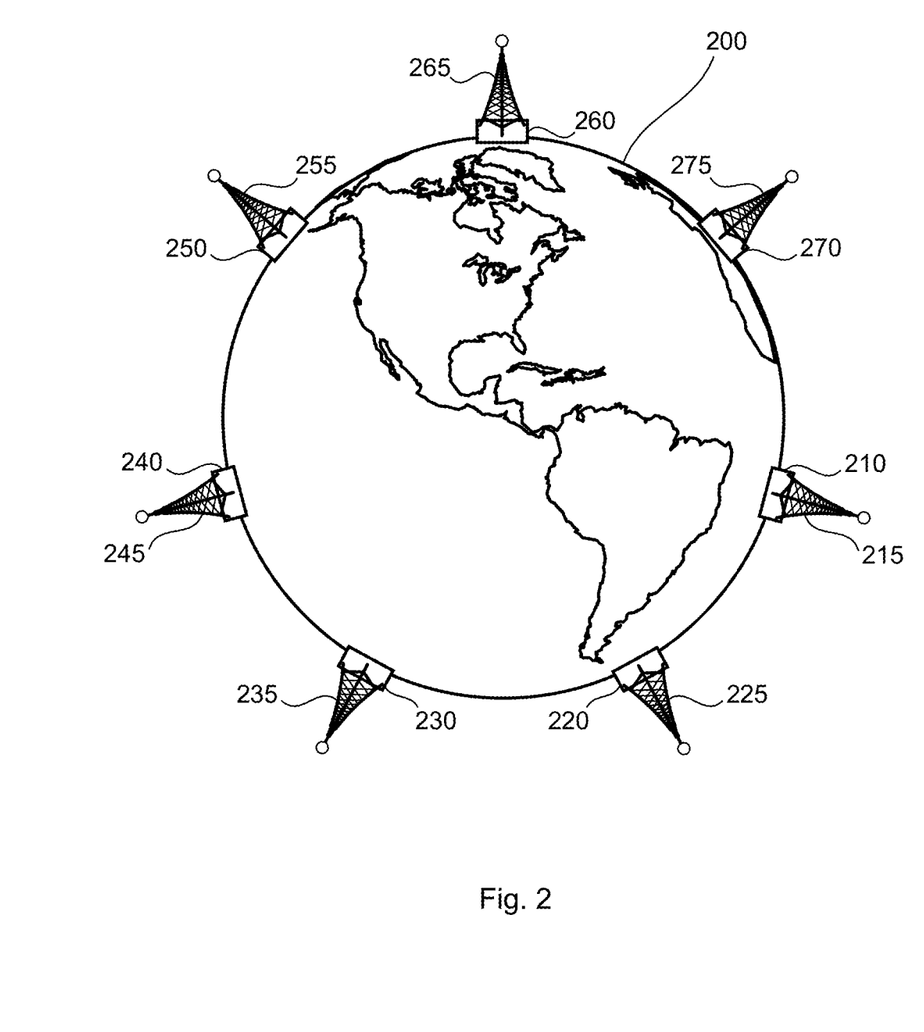
FIG. 2 is a pictorial diagram illustrating distribution of a database according to aspects of the disclosure.

FIG. 2 is a geographical illustration of data centers 210, 220, 230, 240, 250, 260 and 270 positioned at various locations on earth. According to some examples, each datacenter may include an atomic time master. Each atomic time master may be connected to a receiver such as a GPS receiver for receiving time signals. The GPS receivers may include, for example, roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter.

Figure 3:
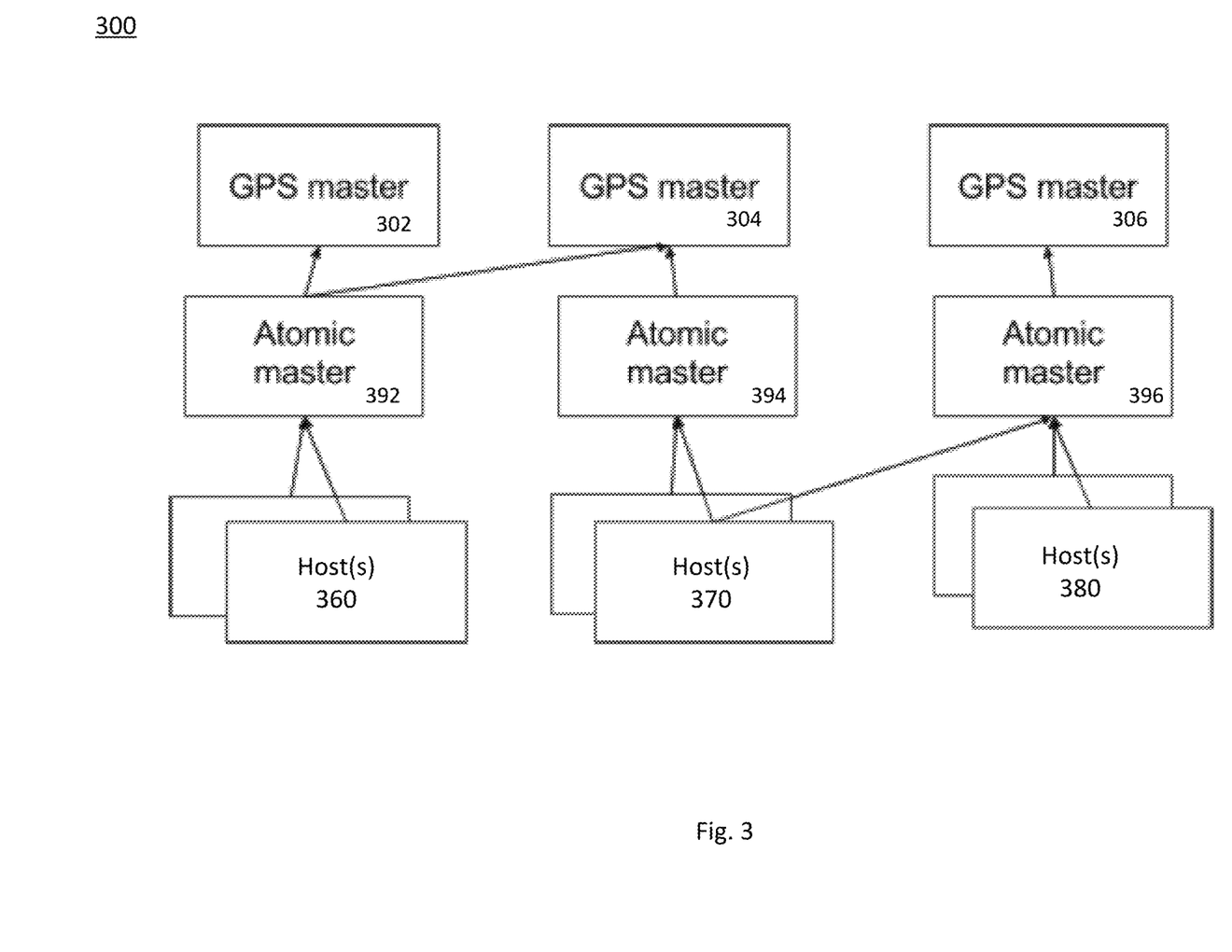
FIG. 3 is a block diagram illustrating hierarchical relationships among servers in a distributed database according to aspects of the disclosure.

FIG. 3 illustrates an example of a time platform 300 that provides a tightly synchronized global clock across datacenters. In this example, the platform 300 is structured as a three-level hierarchy of servers, each server including its own clock, where child servers calibrate their clocks based on their parents' clocks. Application programs run on hosts 360, 370, 380.

Arrows point from servers that calibrate their clocks to well-known servers with better clocks from which they calibrate. For example, as shown, hosts 360 calibrate their clocks based on atomic master 392. Atomic master 392 calibrates its clock based on GPS time masters 302, 304. Hosts 370 calibrate their clocks based on atomic master 394 and 396. Atomic master 394 calibrates its clock based on GPS master 304. Hosts 380 calibrate their clocks based on atomic master 396, which calibrates its clock based on GPS master 306. In some examples, child servers may determine which parent servers to use for calibration based on, for example, geographical position, signal strength, or any other indicia. In other examples, the child/parent pairings may be predetermined. While FIG. 3 shows the hosts 360, 370, 380 calibrating to the atomic masters 392, 394, 396, it should be understood that in other examples the hosts 360, 370, 380 may additionally or alternatively calibrate directly to the GPS time masters 302, 304, 306.

At each level in the hierarchy, calibration consists of polling a server's parent(s), and intersecting one or more time intervals received from the parent(s), expanded by network latency of the calibration from the hosts involved. Each server may have an associated value (ε) representing a greatest difference in time between a time reflected on the server's local clock and times reflected by other servers' clocks in the database. Each server's value of E is derived from its parent's ε, with adjustments to uncertainty that come from a product of oscillator frequency uncertainty and effective calibration interval, and server-to-parent network round trip time (RTT). Accordingly, in some examples, a local clock at each server may maintain a different value of ε. In other examples, E may be globally consistent across devices in the system. Further, ε may vary over time in some examples, as parameters such as the oscillator frequency uncertainty, effective calibration interval, and RTT change over time.

Oscillator frequency uncertainty can be modeled as consisting of frequency instability, such as how much an oscillator drifts over short time scales, and oscillator aging, such as how much an oscillator's drift changes over long time scales. The effective calibration interval may be determined by a greater of two values: a calibration interval, such as a period of time between calibrations of the server, and how long the server may have to be disconnected from the parent.

With regard to the server-to-parent network RTT, the farther away a host is from its parents, the more phase uncertainty is introduced. This uncertainty can also be modeled as two components: calibration phase uncertainty and calibration frequency uncertainty. Calibration phase uncertainty may correspond to a level of uncertainty in computing phase alignment of the oscillators. Calibration frequency uncertainty may correspond to a level of frequency uncertainty due to uncertainty in the duration of the calibration period.

Figure 4:
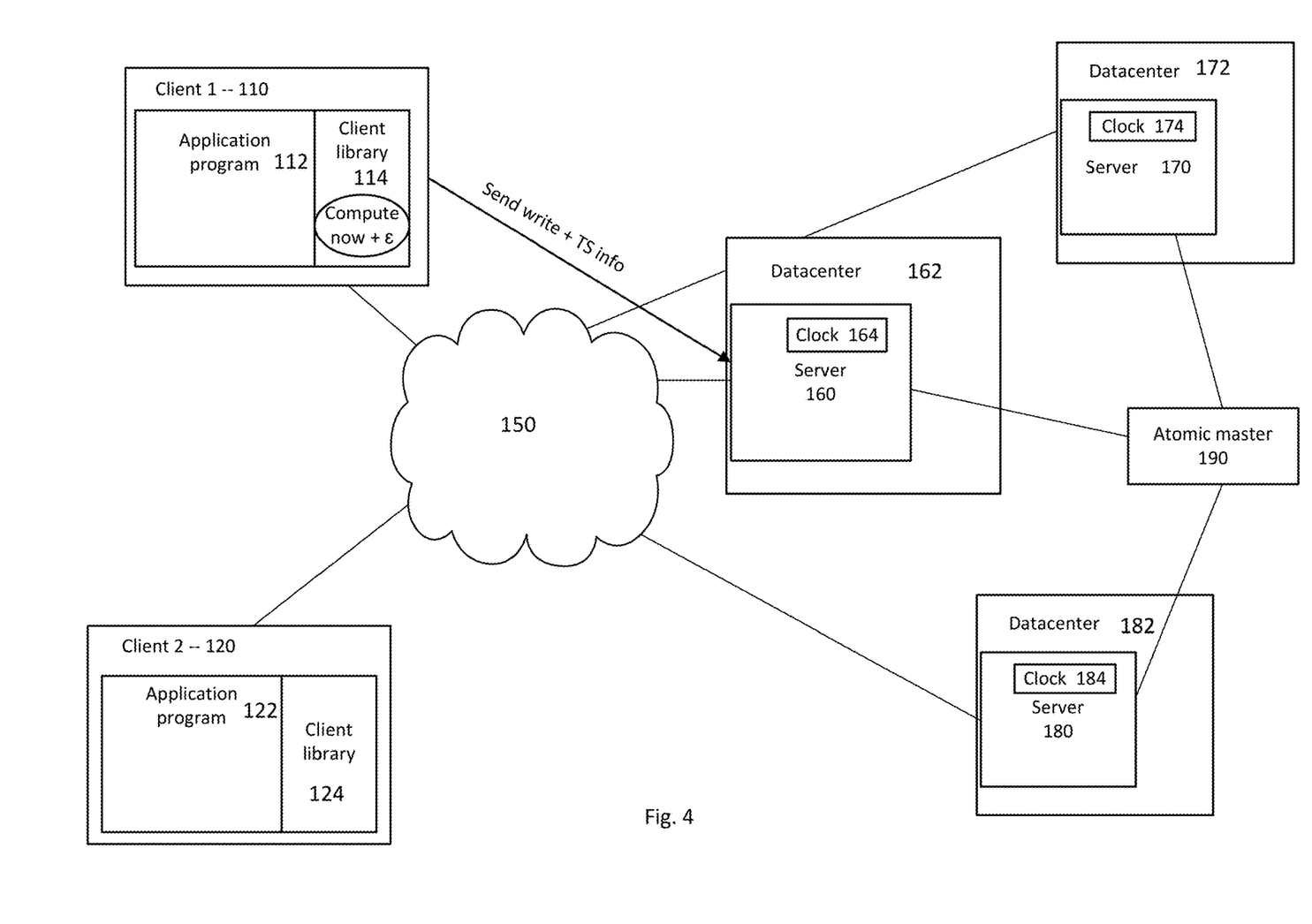
FIG. 4 is a block diagram illustrating an example of moving computation of timestamp information to clients in the system according to aspects of the disclosure.

FIG. 4 illustrates an example where the client device determines a time interval within which a transaction can be committed and provides such information to the server, thereby enabling additional network messages to be exchanged between the client and server during the commit wait period. In this example, the client 110 receives a transaction, for example through a user interface or from another client device. As one example, the transaction may be writing an object to the distributed database. The client 110 determines a time interval corresponding to a current time plus ε. For example, the current time may be a time reflected by the client's local clock during the computation, and ε represents the bounds of uncertainty of the clock, as discussed above in connection with FIG. 3.

When the client 110 sends a write request over the network 150 to the server 160, which commits the object to the database, the client 110 includes information related to the computed time interval. In some examples, the information includes timestamps for a lock-hold interval, during which writes or reads are disallowed. The lock-hold interval is specific to each transaction, beginning when locks for the transaction are all acquired and ending when locks for the transaction are released. The timestamp information provided by the client 110 may dictate when locks are acquired and when the locks are released. In other examples, the timestamp information is used to force the server 160 to commit the transaction at a specific time, such as at a timestamp within the interval corresponding to current time plus ε.

Figure 5:
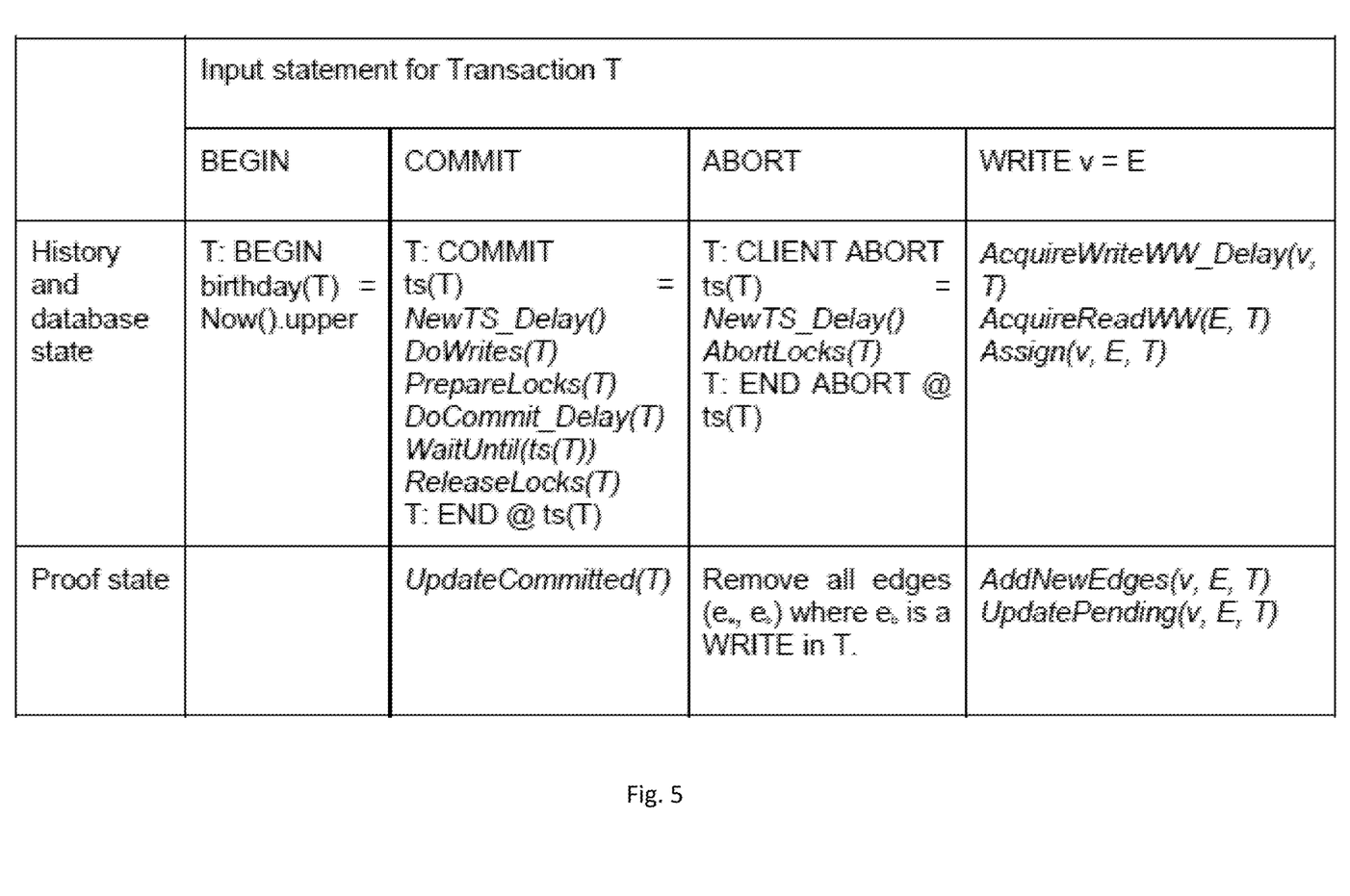
FIG. 5 is a chart illustrating various operations of a transaction in different phases and states according to aspects of the disclosure.

FIG. 5 illustrates an example protocol for moving evaluation of (now+ε) to the client library, as opposed to performing such computation at the server after a commit is called. This optimization may result in an earlier timestamp, and thereby reduce a commit wait period.

Because the client's call to commit is not within the lock-hold interval, evaluating (now+ε) in the client library presents challenges with respect to guaranteeing that the timestamp for the transaction will be within the lock-hold interval. Accordingly, timestamp information is added to the locks to preserve an invariant that a transaction's timestamp falls within its lock-hold interval. Additionally, for buffered writes, no conflicting reads or writes can be allowed to occur between the time of the client's evaluation of (now+ε) and when the transaction finishes acquiring its locks. To ensure that timestamps fall within lock-hold intervals and that no conflicting reads or writes are done between evaluation of (now+ε) and acquiring the locks, metadata is associated with each variable v, representing a target of the transaction. Such metadata includes max_readts(v) and max_writets(v). max_readts(v) is a timestamp of a latest committed read of the variable v, and max_writets(v) is a timestamp of a latest committed write of the variable v. For example, if the target is a field in a database to be changed, such as a total in a bank account, a time of the latest read and a latest write of that field are used as metadata for future transactions. In many instances, such times would be logged.

As shown in FIG. 5, a number of functions are included in the protocol. Some of these functions may be computed based on the metadata of the last committed read timestamp and the last committed write timestamp. As one example, NewTS_Delay(T) increments the max_read and max_write timestamps of the metadata. This call may evaluate a result for a read transaction as result=max(result, ++max_writets (v)), and for a write transaction as result=max(result, ++max_readts(v), ++max_writets(v)).

FIG. 5 sorts functions performed in executing the transaction into different columns based on phases of the transaction. For example, the transaction may be divided into a begin phase, a commit phase, an abort phase, and a write phase. The abort phase is an alternative to completion of the commit phase. Each of these phases may be initiated by the client device, though some actions may be performed by the server. The protocol may further be divided into different rows based on different states of computation.

The database state is the state of the computation at the "current" time, which is logically the point in time immediately after the last transaction that committed in the history. For each transaction T that is in progress, the database maintains a read set, which is a list of database variables read by the transaction so far and values for those variables, and a write set, which is a list of database variables written by the transaction so far, and the values to be installed for those variables if T commits.

The proof state may be built to prove that external consistency results from executing algorithms in the database state. For example, the proof state may include a number of annotations, which are not maintained by an actual database. Such annotations may include an event schedule and an event-dependency graph for all committed transactions, as well as the state needed to extend those data structures whenever any in-progress transaction commits (or aborts). The event dependency graph illustrates an order in which transactions were committed, and indicates which transactions are dependent on which others. As a simplistic example, if a first transaction consisted of adding 5 to a number in the database, and a second transaction consisted of doubling the number in the database, a different result would be produced by switching the order in which the transactions were committed. Accordingly, the second transaction may be considered to be dependent on the first. To update the event dependency graph, while the transaction is executing, a set of potential event-dependency edges that will be added should the transaction commit (or abort) may be generated. For example, the scheduler may keep a global state about the READ and WRITE events for every variable in the database, as well as per-transaction state about the READ and WRITE events for every transaction. The global state for each variable may include the last committed WRITE event, for which any subsequent READ event receives a write-read dependency and any subsequent write event receives a write-write dependency. The global state may also include a set of all of the committed READ events that read the value of the last committed write. Any subsequent WRITE event receives a read-write dependency from every event in the set. For each in-progress transaction, potential changes to the last committed read event and last committed write event are tracked as "pending."

In the history and database state, the transaction begins in the begin phase for a new transaction T which may have been received by the client. Next, in the write phase, AcquireWriteWW_Delay(v, T), acquires write locks in a way that avoids deadlock. For example, if a higher priority transaction requires a lock held by another transaction, the higher priority transaction forces the other transaction to release the lock and try again. Other techniques for avoiding deadlock may alternatively or additionally be used. For AcquireWriteWW_Delay(v, T), however, the write lock is not acquired immediately. Rather, the function computes a result, but defers acquiring the write lock and doing the write until the client calls commit. This reorders dependencies that are created as well. AcquireRead(E, T) acquires all locks needed by a transaction to evaluate an expression E. Some locks will not be needed, because they are already held by the transaction. Further, Assign(v, E, T) adds a result of an expression evaluation to the write set of the transaction. For every variable $v_i$ in expression E that is not in the union of read and write sets for T, a value is assigned and stored in a table in association with the variables.

In the commit phase, the commit is initiated by the client outside the lock-hold interval. A timestamp for the transaction is assigned, for example based on a function NewTS_Delay( ). Further, the transaction is committed during a lock-hold interval through functions DoWrites(T), PrepareLocks(T), DoCommit_Delay(T), WaitUntil(ts(T)), and ReleaseLocks(T). As mentioned above, NewTS_Delay(T) increments the max_read and max_write timestamps of the metadata. This call may evaluate a result for a read transaction as result=max(result, ++max_writets(v)), and for a write transaction as result=max(result, ++max_readts(v), ++max_writets(v)). DoWrites(T) acquires all of the locks and then does all of the writes that were saved as a result of calls to AcquireWriteWW_Delay(T). PrepareLocks(T) logs locks that are held for the transaction. This may help ensure consistency by providing information to other transactions regarding the locks that are held, enabling the avoidance of deadlock as discussed above in connection with the function AcquireWriteWW_Delay(v, T). Further, DoCommit_Delay (T) adds data to be written in the transaction to the database, and also updates max_readts(v) and max_writets(v) appropriately for all values of v in the union of read and write sets for T. ReleaseLocks(T) releases the locks for each variable in the transaction.

In some instances, the transaction may be aborted. For example, if a higher priority transaction requires the locks held by the transaction T, the transaction T may need to abort and try again. In the abort phase, the result of NewTS_Delay (T) may be logged and the locks released. Thereafter the transaction may return to the begin phase to try again.

To maintain the proof state, in the write phase potential additions to the event-dependency graph are prepared. AddNewEdges(v, E, T) updates the event-dependency graph based on new READ and WRITE events added in the process of "executing" Assign(v, E, T). For example, $e_w$ may designate the WRITE event added by Assign(v, E, T), and an edge ($e_r$, $e_w$) is added for every READ event $e_r$ to be processed. UpdatePending(v, E, T) updates the proof state due to "executing" Assign(v, E, T). If the transaction is aborted, the potential edges that were prepared are removed. However, if the updated in committed, in the commit phase UpdateCommitted(T) updates the proof state if the transaction T commits.

Figure 6:
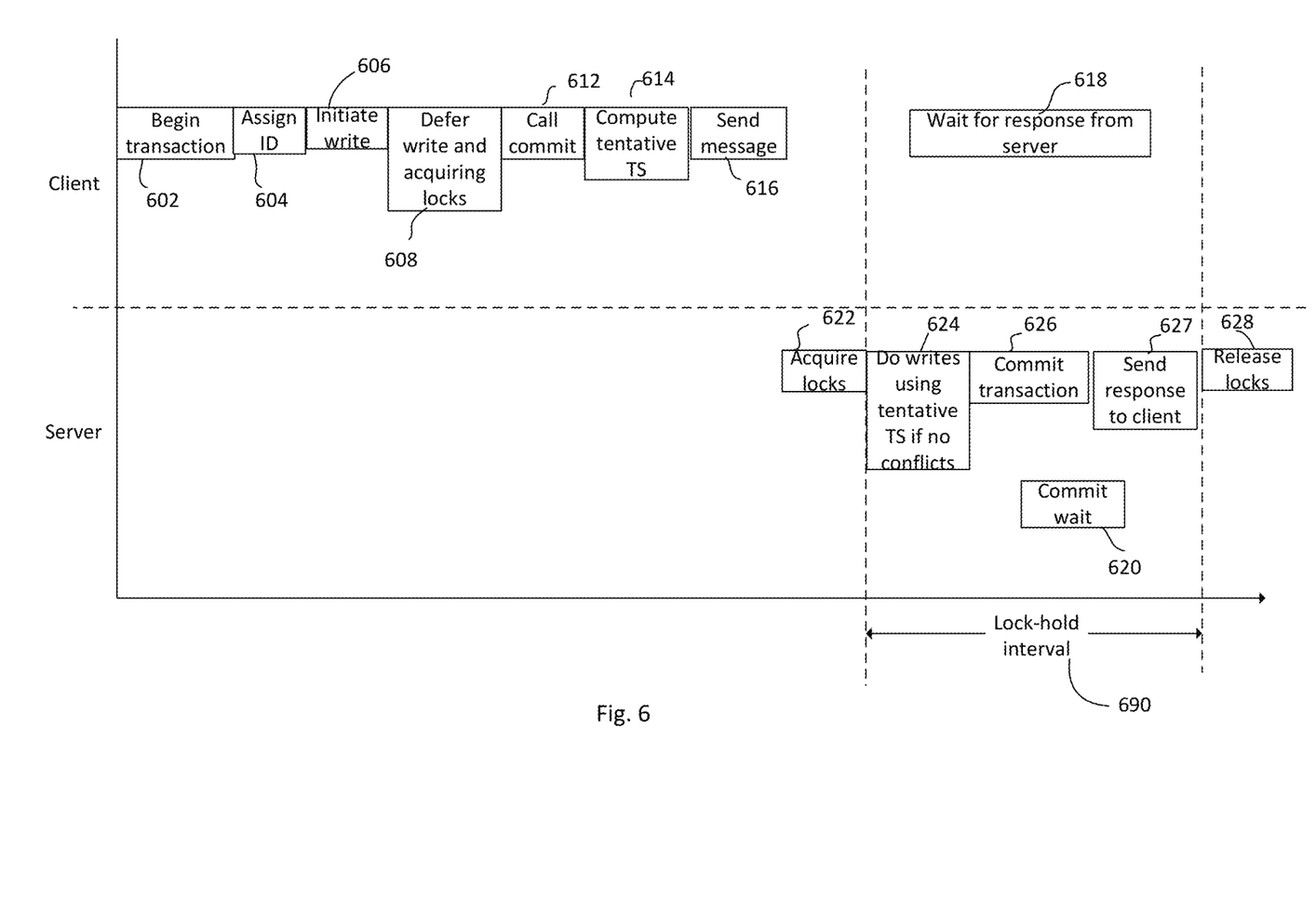
FIG. 6 is a diagram illustrating an example of relative timing of events among devices in the distributed database according to aspects of the disclosure.

FIG. 6 illustrates an example timing diagram for execution of the functions involved in committing a read-write transaction, such as the functions described above in connection with FIG. 5. The diagram is divided into client operations and server operations. The X axis represents time, with lock-hold interval 690 extending for a segment of that time. While the operations are illustrated in a particular order, it should be understood that the order of the operations can be modified, and that some operations may be performed simultaneously with others. Moreover, operations may be added or omitted. For example, operations illustrated as being performed by the server may in some instances be performed by the client.

The client receives a transaction 602, for example through a user input or from another device, and at 604 assigns a unique identifier to the transaction. At 606 the client initiates a write operation, but defers performing the write and acquiring locks (608) until a commit is called. At 612 the client initiates the commit, at which point the server may begin commit wait period (620). The client computes a tentative timestamp for the transaction at 614. For example, the client determines a tentative value corresponding to the current time reflected by the client's local clock plus an interval of uncertainty E. The client at 616 sends a message to the server to commit the write, providing this tentative timestamp value to the server. The server at 622 acquires the locks and begins executing the writes at 624 using the tentative timestamp provided by the client, as long as no conflicts exist. For example, the server may check whether any other transaction holds a lock during a time period that includes the tentative timestamp. If another transaction holds such a lock, but has a lower priority than the transaction received at 602, the other transaction may be forced to give up its locks and starts over. If the conflicting transaction has a higher priority, the computed tentative timestamp may be updated, for example, based on the max read and max write timestamps. For example, the computed tentative timestamp may be moved to a later time to avoid the conflict. At 626, the transaction is committed. Meanwhile, the client waits at 618 until the computed tentative timestamp passes. Once the transaction is committed, the sever send a notification to the client at 627, indicating that the transaction has been committed. Locks are released at 628.

Figure 7:
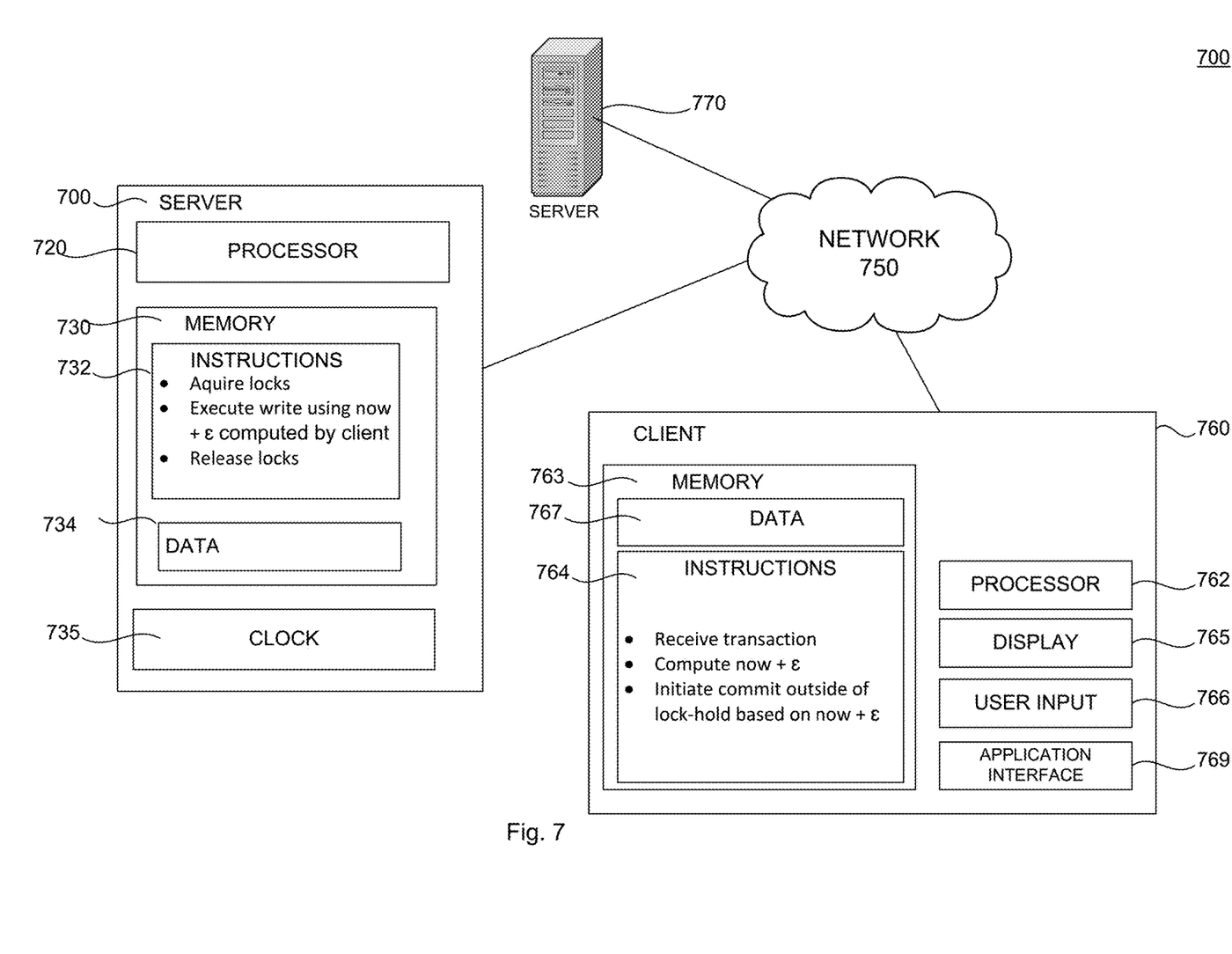
FIG. 7 is another block diagram illustrating an example system according to aspects of the disclosure.

FIG. 7 is a diagram of a system 700 for reducing commit wait times in a distributed database. As shown, an example of system 700 may include a number of servers 710 and 770 coupled to a network 750. The system may also include a client 760 capable of communication with the servers 710 and 770 over the network 750.

The server 710 may contain a processor 720, memory 730, and other components typically present in general purpose computers. The memory 730 can store information accessible by the processor 720, including instructions 732 that can be executed by the processor 720. Memory can also include data 734 that can be retrieved, manipulated or stored by the processor 720. The memory 730 may be a type of non-transitory computer readable medium capable of storing information accessible by the processor 720, such as a hard-drive, solid state drive, tape drive, optical storage, memory card, ROM, RAM, DVD, CD-ROM, write-capable, and read-only memories. The processor 720 can be a well-known processor or other lesser-known types of processors. Alternatively, the processor 720 can be a dedicated controller such as an ASIC.

The instructions 732 can be a set of instructions executed directly, such as machine code, or indirectly, such as scripts, by the processor 720. In this regard, the terms "instructions," "steps" and "programs" can be used interchangeably herein. The instructions 732 can be stored in object code format for direct processing by the processor 720, or other types of computer language including scripts or collections of independent source code modules that are interpreted on demand or compiled in advance. Functions, methods, and routines of the instructions are explained in more detail in the foregoing examples and the example methods below.

The data 734 can be retrieved, stored or modified by the processor 720 in accordance with the instructions 732. For instance, although the system and method is not limited by a particular data structure, the data 734 can be stored in computer registers, in a relational database as a table having a plurality of different fields and records, or XML documents. The data 734 can also be formatted in a computer-readable format such as, but not limited to, binary values, ASCII or Unicode. Moreover, the data 734 can include information sufficient to identify relevant information, such as numbers, descriptive text, proprietary codes, pointers, references to data stored in other memories, including other network locations, or information that is used by a function to calculate relevant data. For example, the data 734 can include time data that may be encoded based on the instructions 732 in a time format used to describe instants of time such as Coordinated Universal Time, Unix epoch and unambiguous International Atomic Time epoch.

Although FIG. 7 functionally illustrates the processor 720 and memory 730 as being within the same block, the processor 720 and memory 730 may actually include multiple processors and memories that may or may not be stored within the same physical housing. For example, some of the instructions 732 and data 734 can be stored on a removable CD-ROM and others within a read-only computer chip. Some or all of the instructions and data can be stored in a location physically remote from, yet still accessible by, the processor 720. Similarly, the processor 720 can actually include a collection of processors, which may or may not operate in parallel.

Servers 710 and 770 may be at one node of network 750 and capable of directly and indirectly communicating with other nodes of the network 750. For example, the servers 710 and 770 can include a web server that may be capable of communicating with client device 760 via network 750 such that it uses the network 750 to transmit information to a client application. Servers 710 and 770 may also include a number of computers, e.g., a load balanced server farm, that exchange information with different nodes of the network 750 for the purpose of receiving, processing and transmitting data to client devices. In this instance, the client computers will typically still be at different nodes of the network 750 than the computers making up servers 710 and 770. Although only a few servers 710, 770 are depicted in FIG. 7, it should be appreciated that a typical system can include a large number of connected servers with each being at a different node of the network 750.

Each client 760 may be configured, similarly to servers 710 and 770, with a processor 762, memory 763, instructions 764, and data 767. Each client 760 may be a personal computer, intended for use by a person having all the internal components normally found in a personal computer such as a central processing unit (CPU), CD-ROM, hard drive, and a display device 765, for example, a monitor having a screen, a projector, a touch-screen, a small LCD screen, a television, or another device such as an electrical device that can be operable to display information processed by the processor 762, speakers, a modem and/or network interface device, user input 766, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 760 may include an application interface module 769. The application interface module may be used to access a service made available by a server, such as servers 710 and 770. For example, the application interface module may include sub-routines, data structures, object classes and other type of software components used to allow servers and clients to communicate with each other. In one aspect, the application interface module 769 may be a software module operable in conjunction with several types of operating systems known in the arts. For example, the client 760 may be connected to a Structured Query Language (SQL) database server that may operate in conjunction with the application interface module 769 for saving and retrieving information data. Memory 763 coupled to a client 760 may store data 767 accessed by the application module 769. The data 767 can also be stored on a removable medium such as a disk, tape, SD Card or CD-ROM, which can be connected to client 760.

Servers 710 and 770 and client 760 can be capable of direct and indirect communication such as over network 750. For example, using an Internet socket, a client 760 can connect to a service operating on remote servers 710 and 770 through an Internet protocol suite. Servers 710 and 770 can set up listening sockets that may accept an initiating connection for sending and receiving information. The network 750, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although FIG. 7 shows computing devices 710 and 760 as individual blocks, each of which contains its own processor and memory, the operations described herein may involve a single computing device or many computing devices, e.g., in the "cloud". For example, various operations described herein as involving a single computing device (e.g., a single central processing unit (CPU) in a single server) may involve a plurality of computing devices (e.g., multiple processors in a load-balanced server farm). Similarly, memory components at different locations may store different portions of instructions 732 and collectively form a medium for storing the instructions. In some examples, device 760 may function as a thin client wherein device 710 performs all or nearly all operations that are not directly related to receiving and providing information to users via user input component 766 and display 765. Various operations described herein as being performed by a computing device may be performed by a virtual machine. By way of example, instructions 732 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Example Methods

Figure 8:
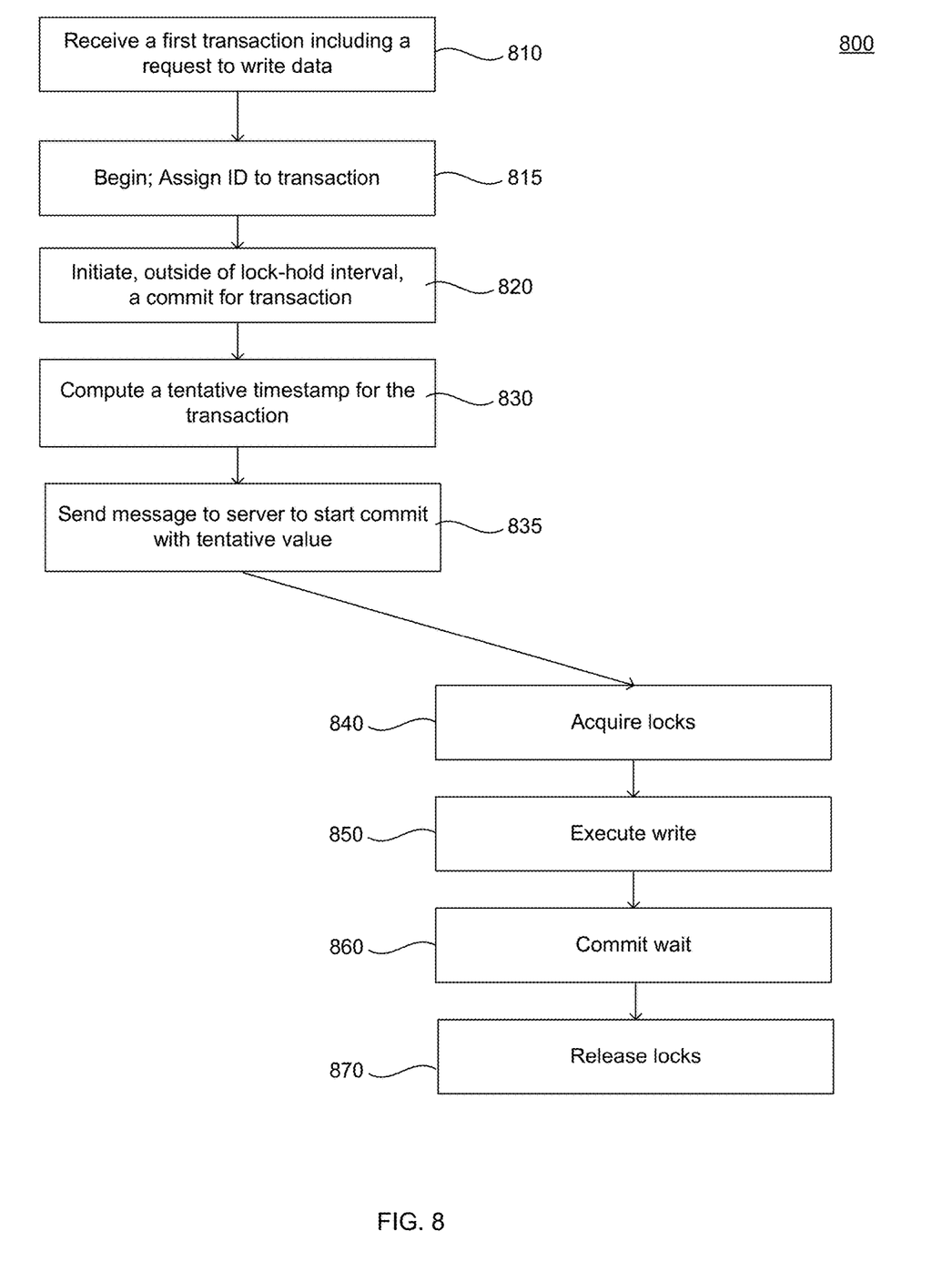
FIG. 8 is a flow diagram illustrating an example method according to aspects of the disclosure.

FIG. 8 illustrates an example method for reducing commit wait times by reading a clock earlier at the client. It should be understood that the following operations do not have to be performed in the precise order described below. Rather, various steps may be handled in a different order or simultaneously. Steps may also be added or omitted unless otherwise stated.

In block 810, the client receives a first transaction, for example, from a user or from another client device. The first transaction may include a request to write data to a distributed database. For example, the first transaction may be a read-modify-write (RMW) command, or any other type of command.

In block 815, the client begins execution of the transaction. This may include assigning a unique identifier to the transaction. Such identifier may be included in messages exchanged between the client and a server for committing the transaction.

In block 820, the client initiates a commit for the transaction. The commit is initiated by the client outside of a lock-hold interval in which read locks and/or write locks are held. In initiating the commit, the client may send one or more messages to the server. These messages may include, for example, metadata relating to a latest committed transaction, updates to previously provided information, other information for assigning timestamps to the lock-hold interval, etc.

In block 830, the client computes a tentative timestamp for the transaction. This tentative timestamp may be a value that corresponds to a current time, such as a time reflected on a local clock of the client when the value is computed, plus $\varepsilon$. $\varepsilon$ corresponds to bounds of uncertainty of times in the database. For example, $\varepsilon$ may be computed as a difference between a latest time reflected by a clock in the database and an earliest time reflected by a clock in the database. Due to calibrations of servers based on parent servers, oscillator frequency uncertainty for each device, and/or other factors, each device may have its own value for $\varepsilon$. For example, a value of $\varepsilon$ at a first server in the database may be different from a value of $\varepsilon$ at a second server in the database. In some examples, each device may store information enabling the device to quickly compute its own value of $\varepsilon$.

In block 835, the client sends a message to the server to start commit of the transaction using the computed tentative timestamp value.

In block 840, the server obtains a lock for the first transaction, such as a write lock. Once the locks are obtained, no further writes to the database are permitted until the locks are released.

In block 850, the server executes the write transaction, and the server writes data associated with the transaction to the database. For example, if the transaction is a read-modify-write transaction to update a field in the database with new data, the server would update the field by entering the new data.

In block 860, the server waits for a time corresponding to the computed value to pass. In block 870, the server releases the lock for the transaction. Accordingly, regardless of any uncertainty in the database as to a current time and when the transaction was committed, other devices in the database will read the database consistently.

While various operations in the examples above have been described relative to a server or client, it should be understood that such operations may alternatively or additionally be performed by other devices.

Moving the evaluation of a current time plus E to the client library, as described in the foregoing examples, in effect reduces the commit wait time, and thereby decreases latency, which as a result increases throughput. For example, by assigning timestamps to the lock-hold interval, a length of the lock-hold interval can be reduced while ensuring that the transaction is committed within the interval. Moreover, such methods and systems can be implemented in a cost effective way, without requiring replacement of all hardware in existing systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   receiving, at a client in a distributed system, a transaction to be committed to a server in communication with the client;
   computing, with one or more processors in a client library of the client, a tentative timestamp for the transaction, wherein the tentative timestamp is computed using a value for a current time plus a variable corresponding to bounds of uncertainty of clocks in the distributed system, the clocks including at least a client clock at the client and a server clock at the server; and
   initiating, with the one more processors, a commit for the transaction based on the computed tentative timestamp, wherein initiating the commit for the transaction is performed by the client outside of a lock-hold interval for the transaction.

2. The method of claim 1, further comprising:
acquiring locks for the transaction;
executing a write for the transaction;
waiting for a time corresponding to the computed tentative timestamp to pass; and
releasing the locks.

3. The method of claim 2, further comprising adding timestamp information to locks, the timestamp information guaranteeing that the client generates a timestamp for the transaction during the lock-hold interval.

4. The method of claim 3, wherein the added timestamp information includes a max read timestamp of a latest committed read, and a max write timestamp of a latest committed write.

5. The method of claim 4, wherein executing the write for the transaction is delayed based on at least one of the max read timestamp or the max write timestamp.

6. The method of claim 2, wherein the transaction is a write buffered in a memory of the client, and further comprising:
ensuring that there are no conflicting reads or writes between the computing the tentative timestamp and when the transaction finishes acquiring its locks.

7. The method of claim 6, further comprising deferring, by one or more processors of a server, acquisition of a write lock or execution of the write until the client calls for commit.

8. The method of claim 1, wherein initiating the commit comprises sending a message to the server to execute the transaction using the computed tentative timestamp.

9. A system, comprising:
a client device, the client device comprising one or more processors programmed to:
receive a transaction to be committed to a server in communication with the client;
compute a tentative timestamp for the transaction, wherein the tentative timestamp is a value for a current time plus a variable corresponding to bounds of uncertainty of clocks in the distributed system, the clocks including at least a client clock at the client and a server clock at the server; and
initiate a commit for the transaction based on the computed tentative timestamp, wherein initiating the commit for the transaction is performed by the client outside of a lock-hold interval for the transaction.

10. The system of claim 9, wherein the one or more processors are further programmed to:
acquire locks for the transaction;
execute a write for the transaction;
wait for a time corresponding to the computed tentative timestamp to pass; and
release the locks.

11. The system of claim 10, wherein the one or more processors are further programmed to add timestamp information to locks, the timestamp information guaranteeing that the client generates a timestamp for the transaction during the lock-hold interval.

12. The system of claim 11, wherein the added timestamp information includes a max read timestamp of a latest committed read, and a max write timestamp of a latest committed write.

13. The system of claim 12, wherein executing the write for the transaction is delayed based on at least one of the max read timestamp or the max write timestamp.

14. The system of claim 10, wherein the transaction is a write buffered in a memory of the client, and wherein the one or more processors are further programmed to ensure that there are no conflicting reads or writes between the computing the tentative timestamp and when the transaction finishes acquiring its locks.

15. The system of claim 14, further comprising a server including one or more processors programmed to defer acquisition of a write lock or execution of the write until the client calls for commit.

16. The system of claim 9, wherein initiating the commit comprises sending a message to the server to execute the transaction using the computed tentative timestamp.

17. A non-transitory computer-readable medium storing instruction executable by one or more processors for performing a method, comprising:
receiving, at a client in a distributed system, a transaction to be committed to a server in communication with the client;
computing, at a client library of the client, a tentative timestamp for the transaction, wherein the tentative timestamp is a value for a current time plus a variable corresponding to bounds of uncertainty of clocks in the distributed system, the clocks including at least a client clock at the client and a server clock at the server; and
initiating a commit for the transaction based on the computed tentative timestamp, wherein initiating the commit for the transaction is performed by the client outside of a lock-hold interval for the transaction.

18. The non-transitory computer-readable medium of claim 17, further storing instructions providing for:
acquiring locks for the transaction;
executing a write for the transaction;
waiting for a time corresponding to the computed tentative timestamp to pass; and
releasing the locks.

19. The non-transitory computer-readable medium of claim 18, further storing instructions for adding timestamp information to locks, the timestamp information guaranteeing that the client generates a timestamp for the transaction during the lock-hold interval.

20. The non-transitory computer-readable medium of claim 19, wherein:
the added timestamp information includes a max read timestamp of a latest committed read, and a max write timestamp of a latest committed write; and
executing the write for the transaction is delayed based on at least one of the max read timestamp or the max write timestamp.

* * * * *